United States Patent
Nakazawa et al.

[11] Patent Number: 5,948,342
[45] Date of Patent: Sep. 7, 1999

[54] RAPID PROTOTYPING METHOD OF SINTERING POWDERY MATERIAL AND FABRICATING APPARATUS USING THE SAME

[75] Inventors: Hiromu Nakazawa, 1-50-7, Matsugaoka, Tokorozawa, Saitama-ken; Mitsuo Ishikawa, Tokyo; Koichi Nishimura, Tokyo; Hiroyuki Tsuyuki, Tokyo, all of Japan

[73] Assignees: Hiromu Nakazawa; Mitsui Seiki Kogyo Kabushiki Kaisha, both of Japan

[21] Appl. No.: 08/996,076

[22] Filed: Dec. 22, 1997

[30] Foreign Application Priority Data

Dec. 25, 1996 [JP] Japan .................................. 8-344703

[51] Int. Cl.⁶ .................................................. B29C 41/02
[52] U.S. Cl. ......................... 264/400; 264/113; 264/154; 264/219; 264/603; 264/642; 425/80.1; 425/81.1; 425/174; 425/290; 425/412
[58] Field of Search ..................................... 264/109, 113, 264/154, 219, 400, 603, 642; 425/80.1, 81.1, 174, 290, 412

[56] References Cited

U.S. PATENT DOCUMENTS 4,851,061  7/1989  Sorkoram ........................... 264/400 X
5,354,414  10/1994  Feygin ................................. 264/113 X
5,637,169  6/1997  Hull et al. ........................... 264/400 X
5,653,925  8/1997  Batchelder .............................. 264/113

FOREIGN PATENT DOCUMENTS

8238768  of 1996  Japan .

Primary Examiner—Leo B. Tentoni
Attorney, Agent, or Firm—Ostrolenk, Faber, Gerb & Soffen, LLP

[57] ABSTRACT

A rapid prototyping method utilizing a powder sintering process and an apparatus for fabricating a product, utilizing the method. The rapid prototyping method includes steps of slicing an image of a product to be fabricated into a number of layers, preparing a mold sheet for each of the slices of the product with a cavity adapted to the profile of the corresponding slice, laying the mold sheet in place on a one-on-the-other basis, feeding the cavity of the mold sheet with a powdery material, pressurizing the material, repeating the preceding steps for each slide to form a multilayer structure for a complete product, and sintering the multilayer structure to produce a finished product. The rapid prototyping method according to the invention provides major advantages over comparable known methods in terms of cost, processing time, and profiling accuracy.

17 Claims, 11 Drawing Sheets

RAPID PROTOTYPING METHOD OF SINTERING POWDERY MATERIAL AND FABRICATING APPARATUS USING THE SAME

BACKGROUND OF THE INVENTION

1. Field of the Invention

This invention generally relates to a rapid prototyping method and a fabricating apparatus using such a method. More specifically, it relates to a rapid prototyping method of slicing an image of a product to be fabricated into a number of layers, preparing a mold sheet for each of the slices of the product with a cavity adapted to the profile of the corresponding slice, feeding the cavity of the mold sheet with a powdery material, pressurizing the material, repeating the above steps to form a multilayer structure for a complete product and sintering the structure to produce a finished product. It also relates to a fabricating apparatus using such a method.

2. Background Art

A number of rapid prototyping (RP) methods of slicing an image of a newly designed product, actually preparing slices of the product and producing a product of the product by assembling the slices have recently been finding commercial applications. Such methods may largely be classified into three types. Photosetting resin is used for a method of the first type, with which an image of a newly developed product is sliced and slices of the product are sequentially formed from photosetting resin by irradiating the resin with laser for setting before they are assembled to produce a mock-up. A method of the second type slices an image of a product and mold sheets are prepared for the respective slices and laid one on the other to form a multilayer structure for a product. Finally, with a method of the third type, a thin layer of a powdery material is formed on a table and subjected to a process involving heating, melting and solidifying by means of laser before the layer is pressurized to produce a slice of the product. The steps are repeated and thereby integrated slices of the product are formed to produce a multilayer structure and any unnecessary powdery material is removed from it before it is sintered to produce a complete product. A rapid prototyping method proposed by the applicant of the present patent application (Japanese Patent Application No. 8-238768) belongs to the third type.

While the above described rapid prototyping methods are effective for molding, they are accompanied by certain respective drawbacks. Methods of the first and second types are not adapted to directly produce a metal product. If a metal product is to be produced by any of such methods, it requires the use of a time-consuming conventional process of preparing a female mold for casting on the basis of a mock up produced by a method of the first or second type. If a multilayer structure is formed from resin, there can be produced various by-products that eventually contaminate the environment. While methods of the third type are advantageous in that they can even produce a nearly net shaped metal product if it is solely made of a powdery material, they have a major disadvantage of not being adapted to prepare high precision objects.

In view of the above identified problems of known methods of the art, it is therefore the object of the present invention to provide a rapid prototyping method using sintering that can directly and hence economically mold a high density and high precision product of any profile within a short period of time from any desired powdery material or a combination of different powdery materials. In addition, the other advantages of a method according to the invention are that it is friendly to the environment and that an economical advantage may be enjoyed.

SUMMARY OF THE INVENTION

In an aspect of the present invention, there is provided a rapid prototyping method utilizing a powder sintering process and comprising steps of slicing an image of a product to be fabricated into a number of layers, preparing a mold sheet for each of the slices of the product with a cavity adapted to the profile of the corresponding slice, laying the mold sheet in place on a one-on-the-other basis, feeding the cavity of the mold sheet with a powdery material, pressurizing the material, repeating the preceding steps of from the step of preparing a mold sheet to the step of pressurizing a material for each slice to form a multilayer structure for a complete product, sintering the multilayer structure to produce a finished product and removing the residual debris including those of the mold sheets.

According to another aspect of the invention, there is also provided a rapid prototyping method utilizing a powder sintering process and comprising steps of slicing an image of a product to be fabricated into a number of layers, arranging a blank support sheet, preparing a mold sheet for each of the slices of the product with a cavity adapted to the profile of the corresponding slice, laying the mold sheet in place on the blank support sheet on a one-on-the-other basis, feeding the cavity of the mold sheet with a powdery material, pressurizing the material, repeating the preceding steps of from the step of preparing a mold sheet to the step of pressurizing a material for each slice to form a multilayer structure for a complete product, sintering the multilayer structure to produce a final product and removing the residual debris including those of the mold sheets.

According to still another aspect of the invention, there is also provided a rapid prototyping method utilizing a powder sintering process and comprising steps of slicing on image of a product to be fabricated into a number of layers, arranging a blank mold sheet in place for the slices on a one-on-the-other basis, forming in the blank sheet a cavity adapted to the profile of the corresponding slice, feeding the cavity of the mold sheet with a powdery material, pressurizing the material, repeating the steps of from the step of arranging a blank mold sheet to the step of pressurizing a material for each slice to form a multilayer structure for a complete product, sintering the multilayer structure to produce a finished product and removing the residual debris including those of the mold sheets.

With any of the above methods, preferably, the mold sheets are laid sequentially on the bottom of a jig as they are held by the jig at the outer periphery thereof. It is preferable that a pair of blank mold sheets are arranged respectively on the top and under the bottom of the layered mold sheets.

After the step of pressurizing each of the mold sheets, the overlying sheet placed on the former mold sheet may be bonded to the former mold sheet.

When the product to be fabricated has a relatively simple profile, the mold sheets having respective cavities adapted respectively to the corresponding profiles of the slices may be laid one on the other before repeating the steps of feeding the lowermost empty mold with the powdery material and pressurizing it and sintering the multilayer structure.

If such is the case, all or part of the mold sheets may be laid and bonded one on the other before repeating the aforementioned steps.

For the purpose of the invention, the powdery material for feeding the cavity may be a composite comprising a plurality of different component materials. The component materials of such a composite may be used respectively for different specific parts of the finished product.

For the purpose of the invention, the different specific parts may include some or all of the interfaces of the layers and/or all or part of the top, the bottom end and/or the lateral sides of the multilayer structure.

For the purpose of the invention, the mold sheets are made of a material that maintains its shape at room temperature and collapses without giving off harmful vapor when heated. Materials that can be used for mold sheets for the purpose of the invention include pulp, wood, particle boards, plywood, cork sheets and paper waste that can make a method of fabricating a product according to the invention friendly to the environment and adapted to recycling resources.

In a still another aspect of the invention, there is provided an apparatus for fabricating a product, utilizing a powder sintering process, by slicing an image of a product to be fabricated into a number of layers, preparing a mold sheet for each of the slices of the product with a cavity adapted to the profile of the corresponding slice, laying the mold sheet in place on a one-on-the-other basis, feeding the cavity of the mold sheet with a powdery material, pressurizing the material, repeating the preceding steps for each slice to form a multilayer structure for a complete product, sintering the multilayer structure to produce a finished product and removing the residual debris including those of the mold sheets, said apparatus comprising a CAD section for slicing an image of a product and preparing a control program for controlling the operation of a processing machine on the basis of two profiles of the slices, a mold sheet profiling section for producing in each of the sheets a cavity adapted to the profile of the corresponding slice by means of the processing machine, a mold sheet laying section for laying the machined sheet in position on a one-on-the-other basis, a powdery material feeding section for feeding the cavity of the mold sheet with the powdery material, a pressurizing section for applying pressure to the entire mold sheet fed with the powdery material, a sintering section for sintering the multilayer structure prepared by repeating the steps of laying a processed mold sheet, feeding the cavity thereof with the powdery material and pressurizing the entire sheet, and an aftertreatment section for removing the debris including those of the mold sheets from the sintered product.

According to a further aspect of the invention, there is also provided an apparatus for fabricating a product, utilizing a powder sintering process, by slicing an image of a product to be fabricated into a number of layers, preparing a mold sheet for each of the slices of the product with a cavity adapted to the profile of the corresponding slice, laying the mold sheet in place on a one-on-the-other basis, feeding the cavity of the mold sheet with a powdery material, pressurizing the material, repeating the preceding steps of from the step of preparing a mold sheet to the step of pressurizing a material for each slice, pressurizing the entire layers after forming a multilayer structure and subsequently sintering the multilayer structure to produce a complete solid product, said apparatus comprising a CAD section for slicing an image of a product and preparing a control program for controlling the operation of a processing machine on the basis of the profiles of the slices, a mold sheet profiling section for producing in each of the sheets laid in position a cavity adapted to the profile of the corresponding slice to produce a mold sheet by means of the processing machine, a sheet laying section for laying each profiled mold sheet in position and bonding the mold sheet to the underlying sheet on a one-on-the-other basis, a powdery material feeding section for feeding the cavity of the mold sheet with the powdery material, a pressurizing section for applying pressure to the entire mold sheet fed with the powdery material, a sintering section for sintering the multilayer structure prepared by repeating the steps of laying a mold sheet, feeding the cavity thereof with the powdery material and pressurizing the entire sheet and an aftertreatment section for removing the debris including those of the mold sheets from the sintered product.

Preferably, the sintering section is placed in a sintering furnace adapted to produce a non-oxidizing atmosphere in the inside. It is preferable that the processing machine for profiling each mold sheet is a laser cutting machine.

According to the invention, a product is expressed in terms of a multilayer structure comprising a plurality of slices. Therefore, a product having a complicated profile can be produced according to the invention. Any known methods of preparing a mock-up of resin or pulp sheets and then forming a female mold from the mock-up provide major disadvantages in terms of cost, productivity and precision. On the other hand, known methods involving the use of laser for directly irradiating a powdery agglomerate has a drawback of inaccurate profiling and density of the product. As described above, according to the invention, there is provided a rapid prototyping method of fabricating a product by slicing on image of a product, preparing a mold sheet for each of the slices of the product with a cavity adapted to the profile of the corresponding slice, feeding the cavity of the mold sheet with a powdery material, pressurizing the material, repeating the above steps to form a multilayer structure for a complete finished product, sintering the structure to produce a product, carbonizing the mold sheets to decompose them and removing the residual debris of the mold sheets. The profile of each slice can easily be obtained by, e.g. 3-dimensional CAD system. With such a method, a product may be prepared from a newly formulated material if it can be reduced to powder. Additionally, a composite comprising a plurality of different component materials may be used to fabricate a product with a method according to the invention. The component materials of such a composite may be used respectively for different specific parts of the multilayer structure. A product fabricated by a method according to the invention may be made of a material that can minimize the emission of environment contaminating by-products. For the purpose of the invention, mold sheets are made of a material that maintains its shape at room temperature and collapses without giving off harmful vapor when heated. Materials that can be used for mold sheets for the purpose of the invention include pulp, wood, particle boards, plywood, cork sheets and paper waste that can make a method of fabricating a product according to the invention friendly to the environment and adapted to recycling resources. Finally, a rapid prototyping method according to the invention provides major advantages over comparable known methods in terms of cost, processing time, and profiling accuracy.

DETAILED DESCRIPTION OF THE PREFERRED EMBODIMENTS

Now, the present invention will be described by referring to the accompanying drawings that illustrate preferred modes of carrying out the invention. Firstly a rapid prototyping method for fabricating a product by utilizing a powder sintering process according to the invention will be described by referring firstly to FIG. 1A through FIG. 21. Thereafter, an apparatus for fabricating a product according to the invention will be described by referring to FIG. 22.

Figure 1A:
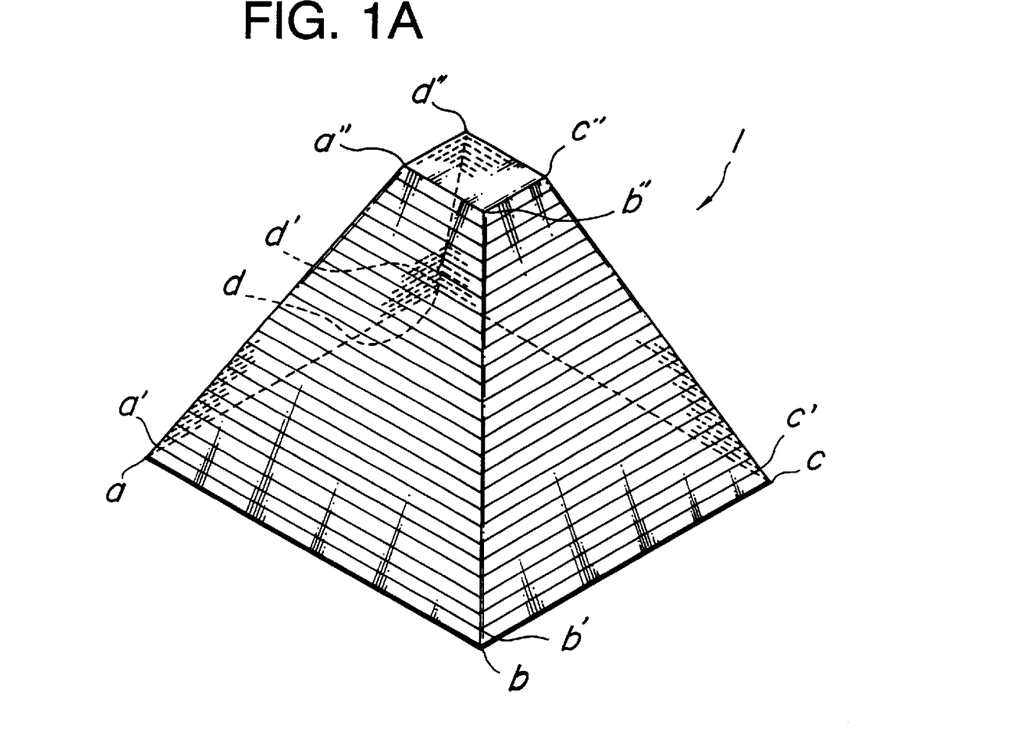
FIGS. 1A and 1B are perspective views of a sliced product as viewed from above and from below respectively according to the invention.
Figure 1B:
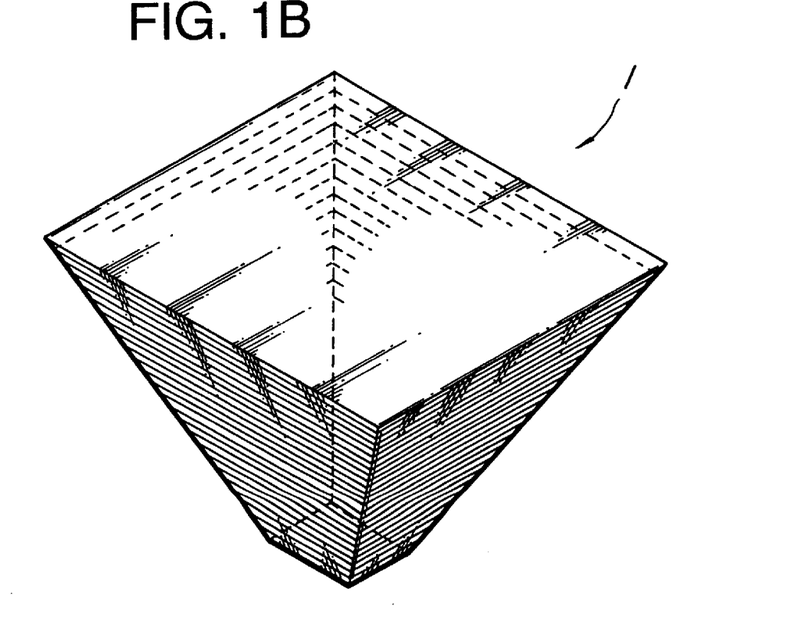

Assume that a truncated pyramid 1 as shown in FIG. 1A is to be fabricated by a method according to the invention. Alternatively, an inverted pyramid as shown in FIG. 1B may be fabricated. The latter provides an advantage that a powdery material can be fed into the mold with ease.

Referring to FIG. 1A, firstly, an image of the pyramid 1 is horizontally cut into a number of slices with a same height. Then, the lowermost slice shows a rectangular profile with corners a, b, c and d. Likewise, the next lowermost slice also shows a rectangular profile with corners a', b', c' and d' and so on. The uppermost slice shows a rectangular profile with corners a", b", c" and d". It will be appreciated that any image other than a truncated pyramid can be sliced and a control program can be prepared for fabricating the slices of the product typically by means of a 3 D CAD.

Figure 2:
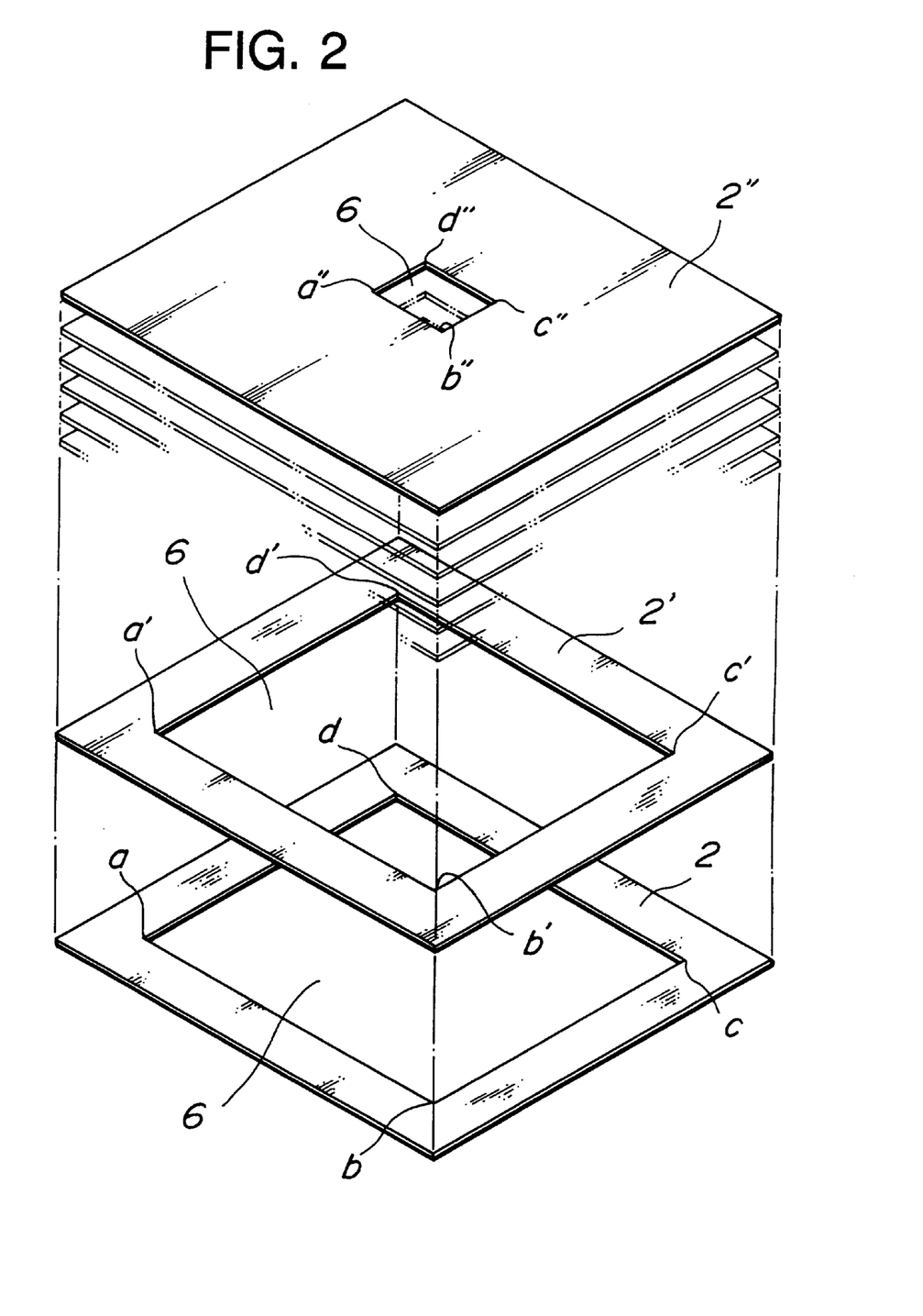
FIG. 2 is a perspective view of several mold sheets to be used for fabricating a product for the product of FIG. 1.

FIG. 2 shows mold sheets 2, 2' and 2" with cavities 6 having profiles that correspond to the rectangular slices with corners a, b, c, and d, a', b', c' and d' and a", b", c" and d" respectively. The mold sheets 2, 2' and 2" have a height substantially equal to that of the slices of the pyramid 1 of FIG. 1A and may have an identical rectangular outer periphery as shown in FIG. 1A. The mold sheets are typically made from a cardboard or a molded sheet of pulp or sow dust. Materials that can be used for mold sheets for the purpose of the invention include pulp, wood, particle boards, plywood, and cork sheets that maintain the shape at room temperature and collapse without giving off harmful vapor when heated to sintering temperature. Any known method may be used to produce a cavity with corners such as a, b, c and d in each mold sheet 2. For example, the cavity may be formed advantageously by laser cutting because the mold sheet is less subjected to thermal deformation and hence a cavity having corners such as a, b, c, and d can be accurately formed with laser. Techniques that can be used for profiling sheets for the purpose of the invention other than laser cutting include plasma cutting, gas cutting and cutting by means of an electrically energized and heated wire.

The process of rapid prototyping according to the invention and using mold sheets with cavities formed in the inside proceeds in a manner as described below.

Figure 3:
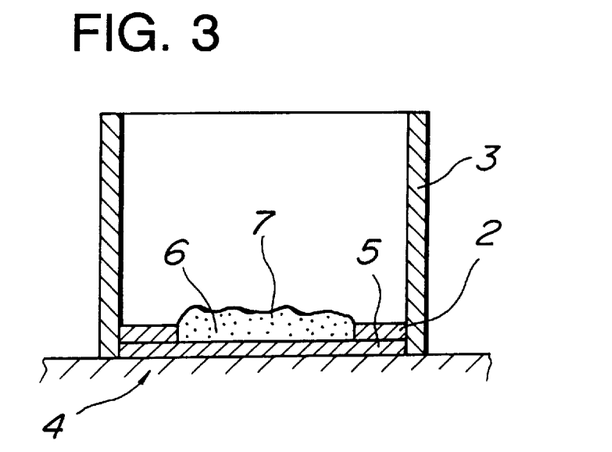
FIG. 3 is a schematic cross sectional view illustrating the first step of a rapid prototyping method according to the invention.

Referring to FIG. 3, a frame 3 has an inner profile adapted to receive the mold sheets 2 and is firmly secured to a bottom plate 4. Firstly, a blank base plate 5 having an outer profile identical with that of the mold sheets 2 is placed on the bottom plate 4. Then, the mold sheet 2 having a cavity corresponding to the lowermost slice with corners a, b, c and d is placed on the base plate 5. The mold sheet 2 may be bonded to the base plate 5 by means of adhesive (not shown).

Then, a powdery material 7 is fed into the cavity 6 of the mold sheet 2. While any appropriate powdery material may be used for the purpose of the invention, it is advantageously selected from the viewpoint of the configuration and the application of the product 1. Note that the powdery material 7 is preferably fed in such a volume that it may partly overflow from the cavity 6.

Figure 4:
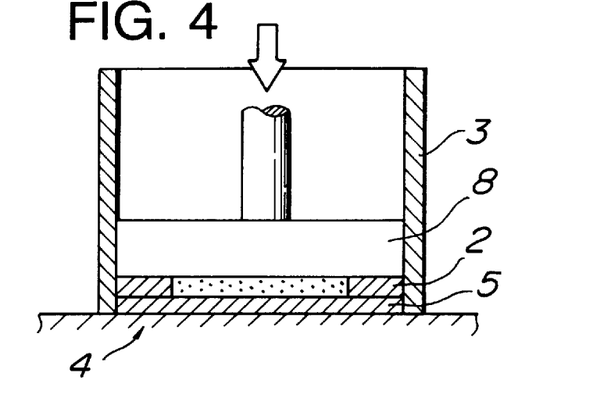
FIG. 4 is a schematic cross sectional view illustrating the pressurizing step of a rapid prototyping method according to the invention.

Referring now to FIG. 4, the mold sheet 2 is pressed from above by means of a press means 8 such as a press until the powdery material 7 in the cavity 6 takes shape and the molded slice of the powdery material is flush with the upper surface of the mold sheet 2.

Figure 5:
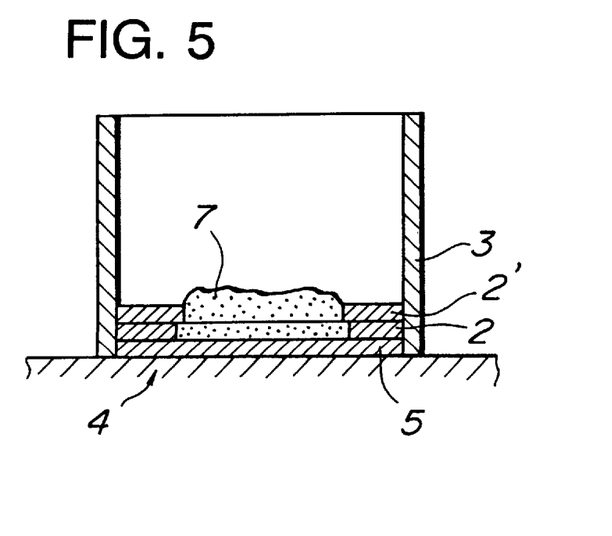
FIG. 5 is a schematic cross sectional view illustrating an intermediary step of a rapid prototyping method according to the invention.
Figure 6:
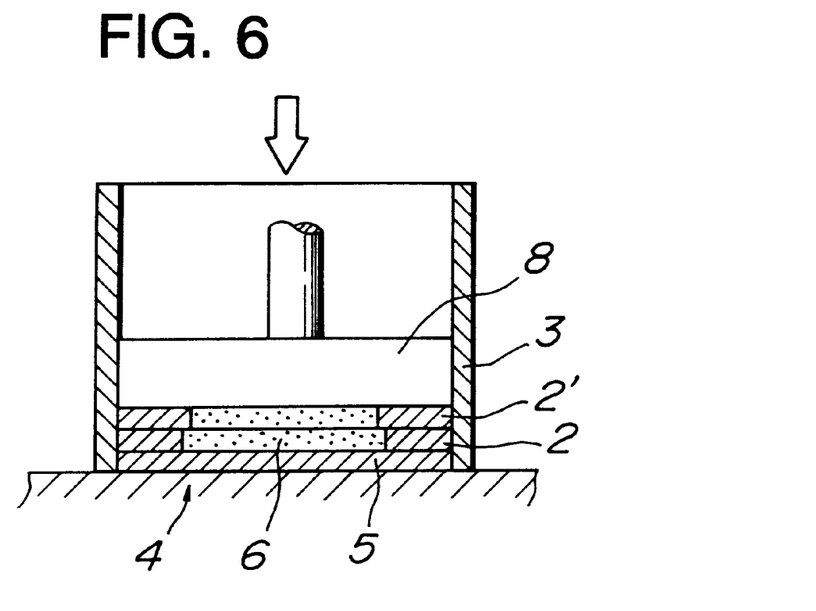
FIG. 6 is a schematic cross sectional view illustrating an intermediary pressurizing step of a rapid prototyping method according to the invention.

Then, after removing the press means 8 as shown in FIG. 5, the mold sheet 2' for the second lowest slice is placed on the mold sheet 2 and a powdery material 7 is fed into a cavity 6 thereof as in the case of the mold sheet 2. The mold sheet 2' and the powdery material 7 in the cavity 6 are pressed by the press means 8 until the molded slice is flush with the upper surface of the mold sheet 2'. Thus, a two-layered structure comprising the mold sheets 2 and 2' and the molded slices is formed. Then, the above slice forming step is repeated until the mold sheet 2" for the uppermost slice is placed on top and a powdery material 7 is fed into a cavity 6 of the mold sheet 2", which powdery material 7 and mold sheet 2" are then pressed by the press means 8. Thereafter, a blank sheet or a top plate 9 is placed on top as shown in FIG. 7.

Figure 7:
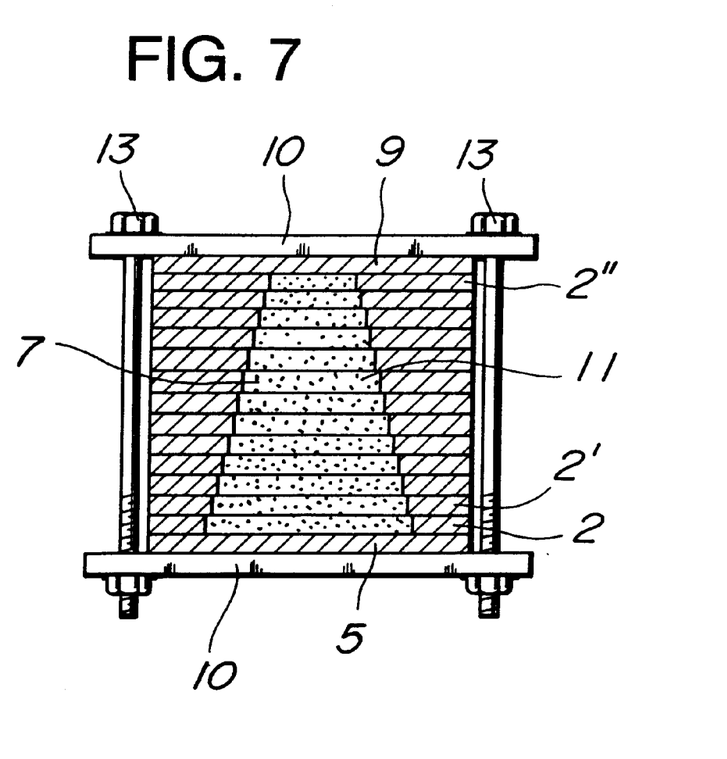
FIG. 7 is a schematic cross sectional view of mold sheets layered by a rapid prototyping method according to the invention.

Once a multilayer structure having the profile of the final product is formed as shown in FIG. 7, the multilayer structure 11 of the sheets and the powdery material is taken out of the frame 3 and then sandwitched and compressed by a pair of press panels 10 arranged respectively on the top and the bottom thereof. The compression may alternatively be conducted within the frame.

While a blank base plate 5 and a blank top plate 9 are used in the above described mode of operation, a multilayer structure 11 of mold sheets and a powdery material may be produced without using top and bottom plates.

Figure 8:
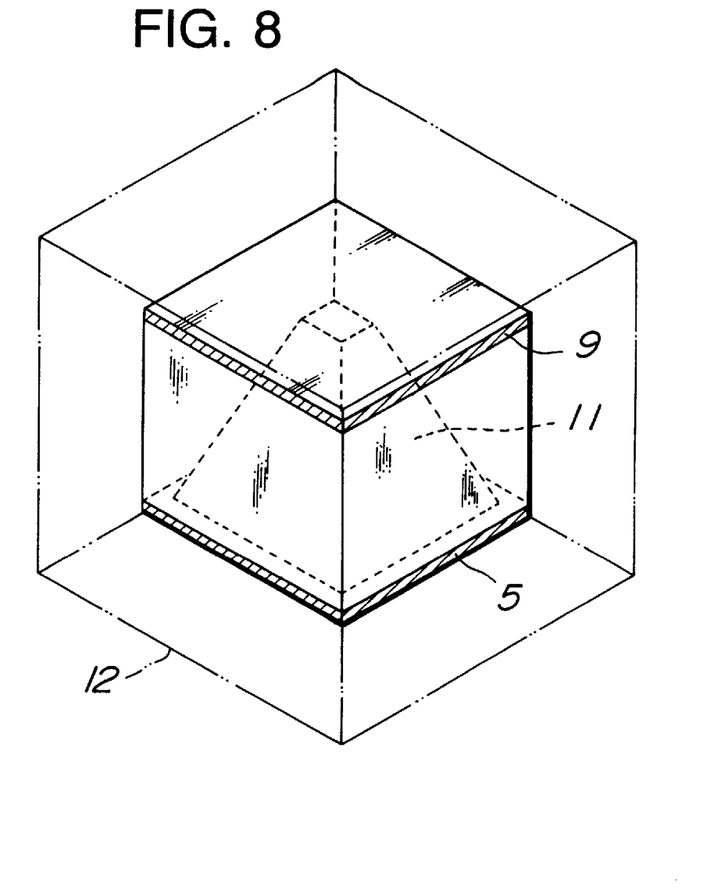
FIG. 8 is a schematic cross sectional view illustrating the sintering step of a rapid prototyping method according to the invention.

Thereafter, the multilayer structure 11 of the mold sheets and the powdery material is taken and placed in a sintering furnace 12. If the frame is made of a thermally collapsible material, it may be moved into the sintering furnace 12 with the multilayer structure 11 of the mold sheets and the powdery material held therein. The inside of the sintering furnace 12 is made to contain a non-oxidizing atmosphere to make the product stably maintain the mechanical strength. The sintering temperature is selected by referring to the melting point and other properties of the powdery material 7.

After the sintering operation, the multilayer structure 11 of the mold sheets and the powdery material is taken out of the sintering furnace 12 and the residual mold sheets that have been carbonized are removed to produce the finished product 1.

While the mold sheets have been processed by means of laser to show respective intended profiles before a powdery material is fed into them in the above described mode of carrying out the invention, the product may alternatively be produced in a manner as described below. Firstly, a blank mold sheet is placed in position and processed by means of laser to produce a cavity therein with a profile corresponding to that of the slice to be formed therein and then a powdery material is fed into the cavity and pressed to produce an intended slice. Thereafter, another blank mold sheet is placed and bonded on top of the profiled sheet and processed by means of laser to produce a cavity therein with a profile corresponding to that of the slice to be formed therein and a powdery material is fed into the cavity and pressed to produce another intended slice. Then, the above operation of placing a blank mold sheet in position, profiling it to produce a cavity, feeding the cavity with a powdery material, removing any unnecessary pieces and pressing the powdery material will be repeated until a complete multilayer structure is formed.

Figure 9:
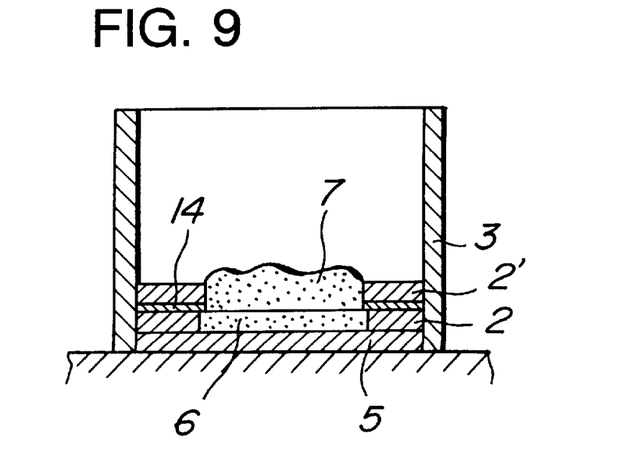
FIG. 9 is a schematic cross sectional view illustrating the adhesive applying step of a rapid prototyping method according to the invention.

FIG. 9 illustrates how a sheet 2 and another sheet 2' lying on the former are bonded together. As described above, when an additional sheet 2' is placed on top of the sheet 2 after the latter is pressed. At this stage of operation, the two sheets have to be accurately aligned to produce a high precision product 1 by molding. While the frame 3 holds the mold sheets 2 and 2' in position as the outer peripheries of the latter are held in tight contact with the inner peripheral walls of the frame 3, they may be displaced, if slightly, from their proper positions for some reason or another particularly when the sheets are pressurized. However, such an undesired relative displacement of the mold sheets 2 and 2' can be avoided by bonding them by means of an adhesive agent 14. The adhesive agent 14 is preferably applied to the upper surface of the lower mold sheet 2 for the purpose of efficiency. No adhesive 14 is applied to the powdery material 7 in the mold sheet 2.

Figure 10:
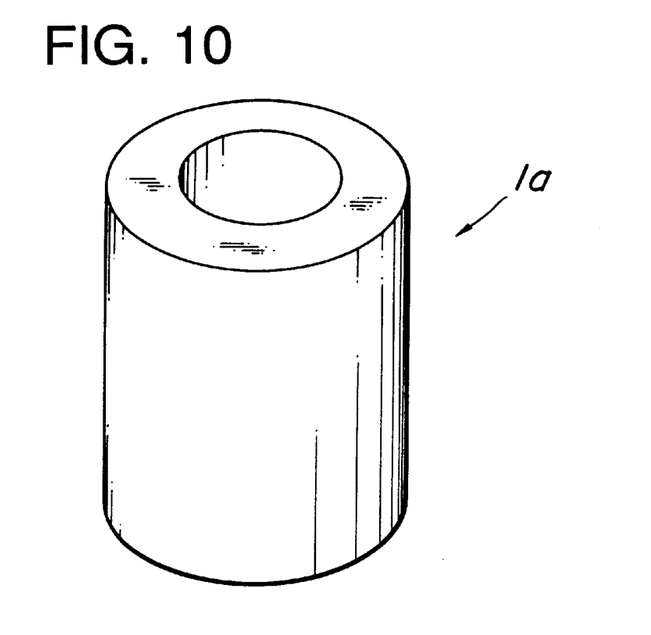
FIG. 10 is a schematic perspective view of a hollow cylindrical product molded by a rapid prototyping method according to the invention.

Various techniques may be used for molding a hollow cylindrical product 1*a* as shown in FIG. 10 by means of a molding method according to the invention. With a typical technique, for example, a blank mold sheet is placed in position within a frame and processed to produce a cavity having a profile corresponding to that of the ring-shaped slice of the cylindrical product to be formed therein and then a powdery material is introduced into the cavity and pressed for molding the ring-shaped slice. Then, another blank sheet is aligned with, placed on top of and bonded to the first sheet except over the entire surface thereof except the area of the ring-shaped slice to produce a succeeding ring-shaped slice of the product. The above process is repeated to form a hollow cylindrical body of the powdery material, which is then sintered to produce the product 1*a*.

Figure 11:
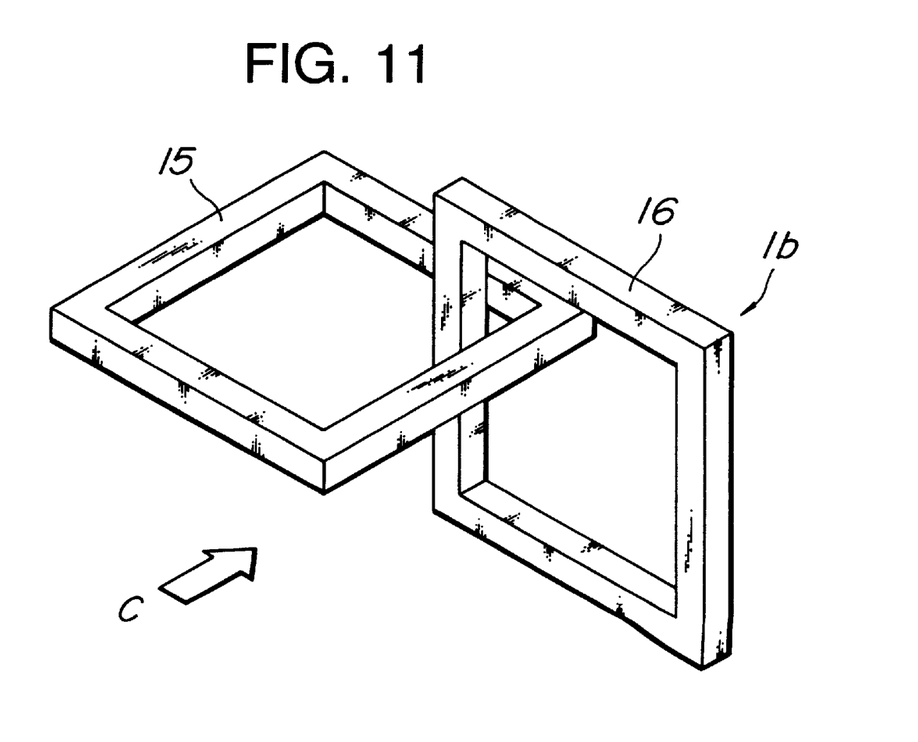
FIG. 11 is a schematic perspective view of a chain-like product molded by a rapid prototyping method according to the invention.
Figure 12:
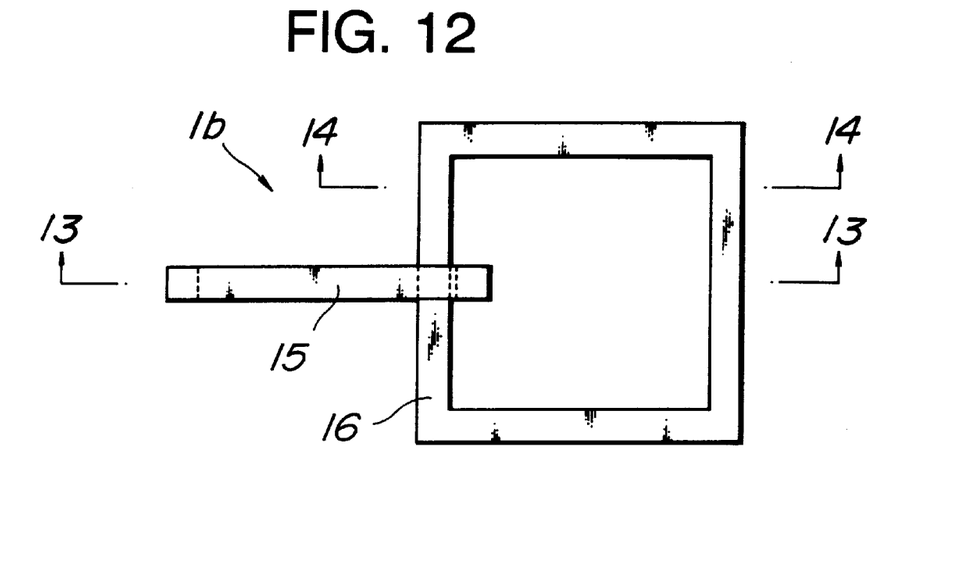
FIG. 12 is a schematic front view of the chain-like product of FIG. 11.
Figure 13:
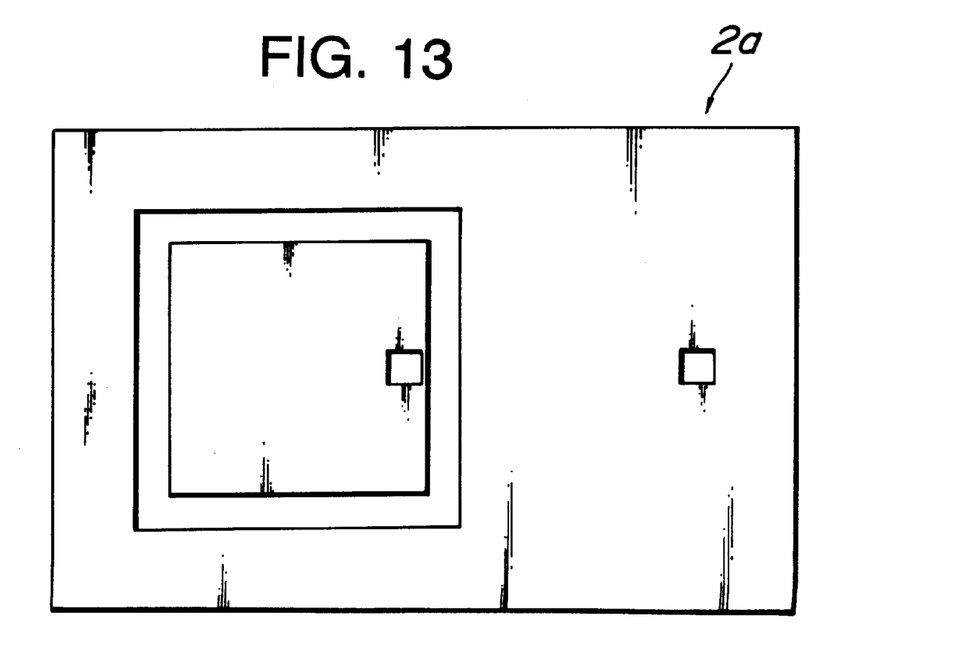
FIG. 13 is a schematic cross sectional plan view of the mold sheet used for the product of FIG. 11 and having cavities taken along line A—A in FIG. 12.
Figure 14:
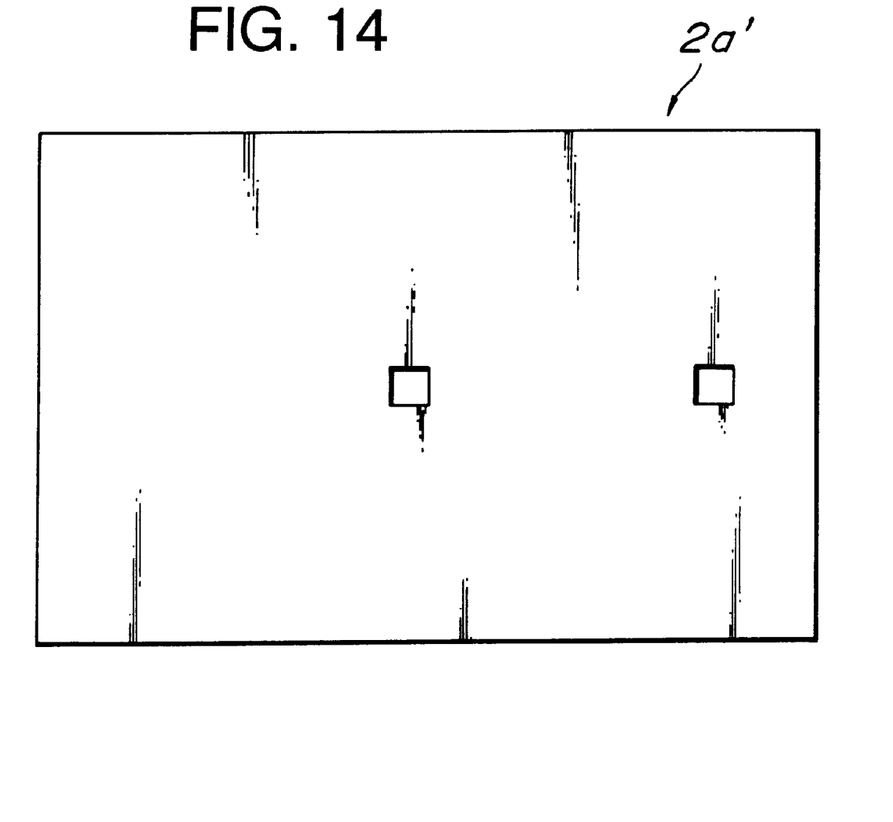
FIG. 14 is a schematic cross sectional plan view of the mold sheet used for the product of FIG. 11 and having cavities taken along line B—B in FIG. 12.

FIGS. 13 and 14 show two different mold sheets to be used for molding a chain-like product 1*b* as shown in FIGS. 11 and 12. The chain-like product 1*b* is a combination of a pair of inseparably linked endless square stripes. FIG. 12 is a schematic front view as viewed in the direction of arrow C in FIG. 11. FIGS. 13 and 14 are schematic cross sectional plan views of the mold sheets used for the product of FIG. 11 and taken along lines A—A and B–D respectively in FIG. 12. Thus, one or more than one mold sheets 2*a* with a cavity corresponding to the cross sectional view taken along line A—A and mold sheets 2*a'* with a cavity corresponding to the cross sectional view taken along line B—B are used to form a multilayer structure having a combined cavity corresponding to the profile of the product 1*b*, which cavity is filled with a powdery material, and the repeatedly prepared multilayer structure is then pressed together and sintered to produce a chain-like product 1*b*. It will be appreciated that a chain-like product 1*b* as shown in FIGS. 11 and 12 would not be fabricated by any known method without difficulty particularly if the two endless square stripes are to be made movable relative to each other. If possible, a known process of fabricating such a product will inevitably involve a large number of steps, while it can be fabricated very easily with a method according to the invention.

Figure 15:
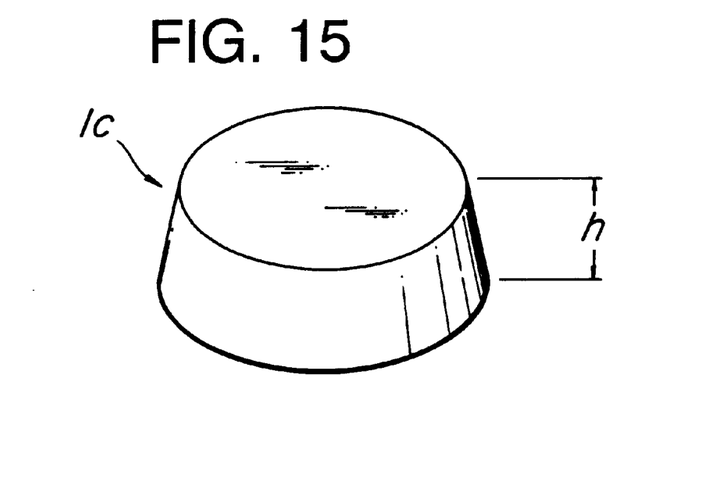
FIG. 15 is a schematic perspective view of a product having a simple configuration and fabricated by a rapid prototyping method according to the invention.
Figure 16:
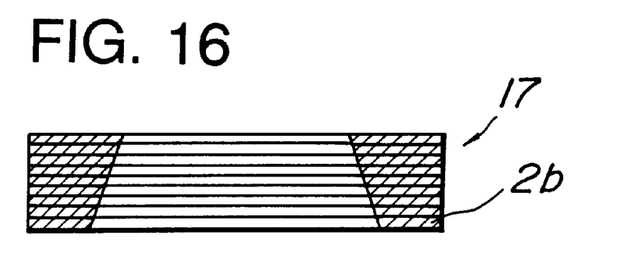
FIG. 16 is a schematic cross sectional view of the mold sheets used for molding the product of FIG. 15.
Figure 17:
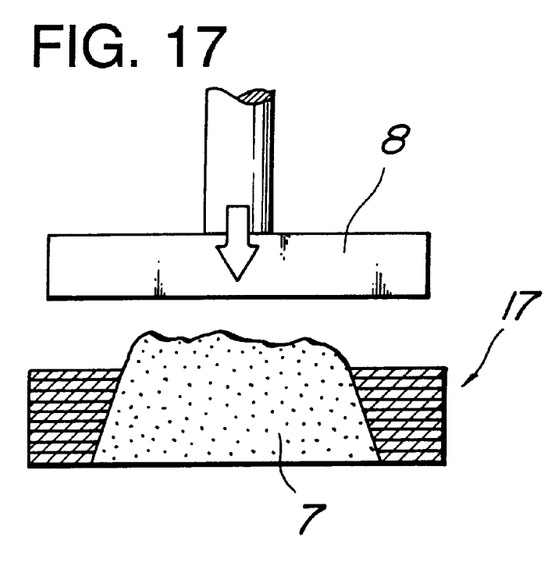
FIG. 17 is a schematic cross sectional view similar to FIG. 16 but illustrating how the product is molded.

While a number of mold sheets are laid one on the other and the cavity of each mold sheet is filled with a powdery material, which is then pressed for the purpose of the invention in the above description, an alternative simplified process as illustrated in FIGS. 16 and 17 may be used if the product to be fabricated has a simple configuration and a low height h as shown in FIG. 15. In such a case, a number of mold sheets 2*b* having respective cavities may be laid one on the other to form a multilayer structure 17 of only the mold sheets, filling the cavities with a powdery material also on a one by one basis as shown in FIG. 16 or, alternatively, a multilayer structure 17 having a cavity corresponding to the profile of the product to be fabricated may be formed typically from wood panels and then the cavity is filled with a powdery material 7 as shown in FIG. 17, which is pressed by press means 8 and sintered with the multilayer structure 17 to produce a product 1c.

Figure 18:
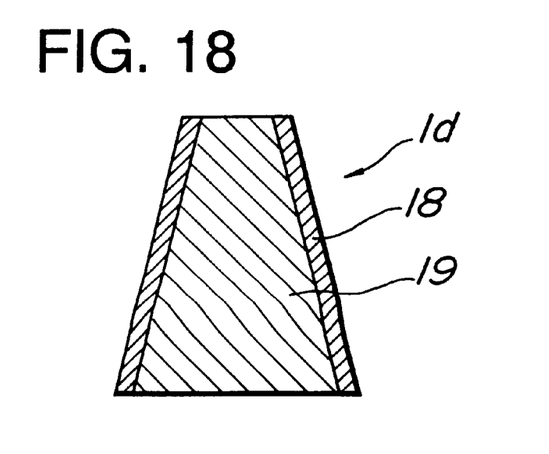
FIG. 18 is a schematic cross sectional view of a product fabricated by a method according to the invention and having a lateral surface made of a hard material.
Figure 19:
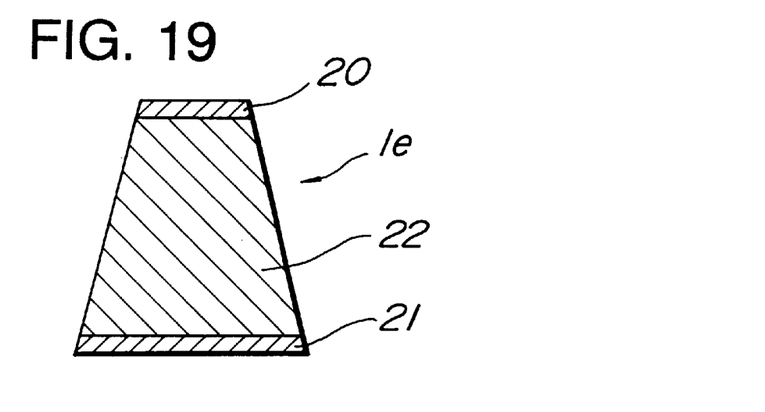
FIG. 19 is a schematic cross sectional view of a product fabricated by a method according to the invention and having top and bottom surface layers made of a hard material.
Figure 20:
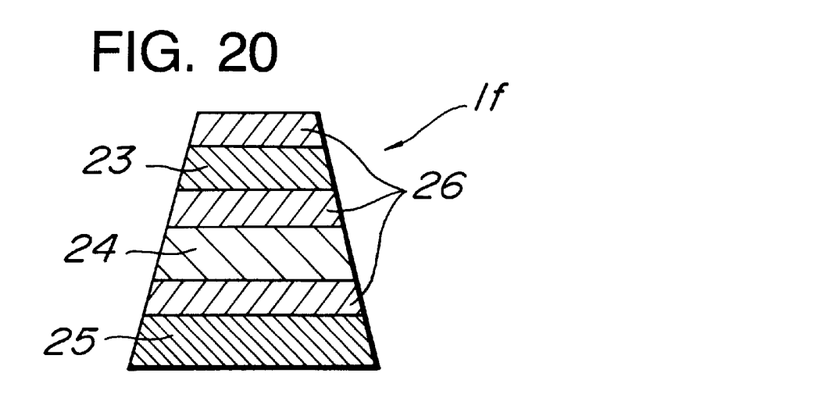
FIG. 20 is a schematic cross sectional view of a product fabricated by a method according to the invention and using different powdery materials for different parts thereof.

FIG. 18 shows a product 1d having a profile substantially similar to that of the product 1 in FIG. 1, although it additionally comprises a lateral surface layer 18 made of a harder material in addition to an internal section 19 made of a softer material. FIG. 19 shows a product 1c comprising top and bottom surface layers 20, 21 made of a harder material and an intermediate section 22 made of a softer material. FIG. 20 shows a product if comprising a number of layers 23, 24, 25 and 26 that are made of respective different materials. The products 1d, 1e and 1f can be easily fabricated by using appropriate powdery materials for the respective layers provided that all the materials can be sintered under a common set of sintering conditions. It will be appreciated that a product having a more complex configuration than any of the above described products may also be used by a method according to the invention.

Figure 21:
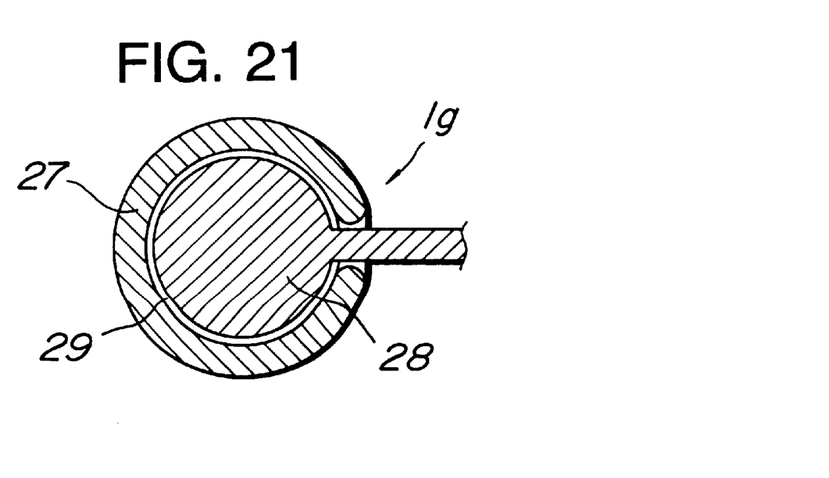
FIG. 21 is a schematic cross sectional view of a product comprising an external spherical member and an internal spherical member and fabricated by a method according to the invention.

FIG. 21 shows a product 1g comprising an external spherical member 27 and an internal spherical member 28 with an appropriate gap 29 provided therebetween. Such a product can also be fabricated by using mold sheets adapted to corresponding slices of the product 1g as in the case of the products 1, 1a, 1b, . . . described above. Note that only the sliding surface layers of the members of the product may be made of a friction-resistive material.

Figure 22:
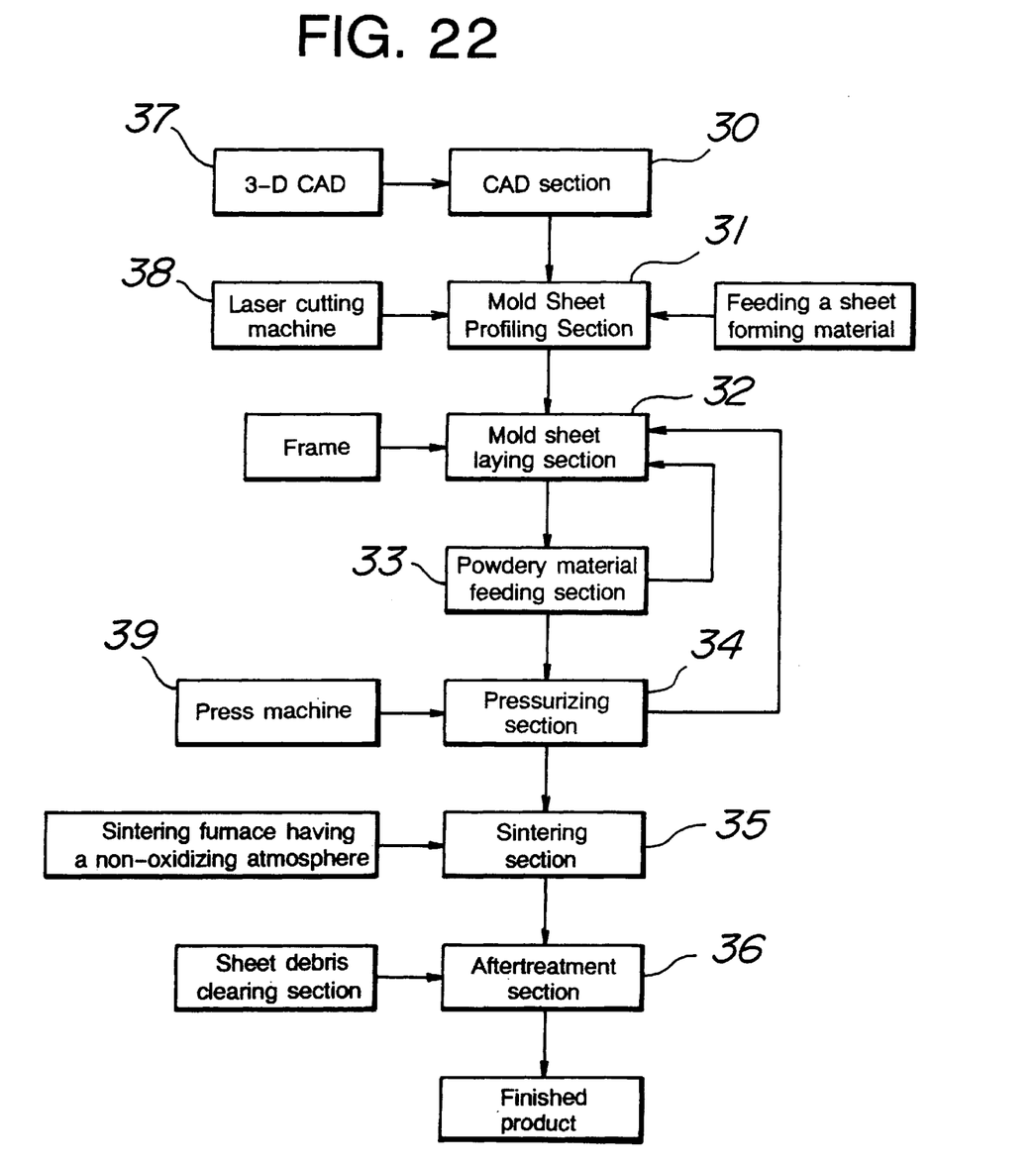
FIG. 22 is a schematic block diagram of an apparatus for fabricating a product by using a rapid prototyping method according to the invention, illustrating the overall configuration of the apparatus.

FIG. 22 is a block diagram of an apparatus for fabricating a product by using a rapid prototyping method according to the invention. It comprises as major components thereof a CAD section 30, a mold sheet profiling section 31, a mold sheet laying section 32, a powdery material feeding section 33, a pressurizing section 34, a sintering section 35 and an aftertreatment section 36.

The CAD section 30 cuts an image of a product (or a product) to be fabricated into a number of slices having an appropriate height, determines the profile of each of the slice by computation and prepares a control program for controlling the operation of a processing machine for producing in each of the sheets a cavity adapted to the profile of the corresponding slice by means of the processing machine such as a laser cutting machine. More specifically, a 3-D CAD 37 may suitably be used for the purpose of the invention. The profile of the cavity of each of the mold sheets can be defined precisely and relatively easily by means of the 3-D CAD 37.

The mold sheet profiling section 31 comprises a mechanical section adapted to place a blank mold sheet having a height corresponding to that of the slices and a predetermined outer profile in position on a laser cutting machine 38, which is also a component of the mold sheet profiling section 31 and operated by the control program that has been prepared by the 3-D CAD 37 as described above to produce a predetermined cavity in the mold sheet by cutting. Any laser cutting machine 38 may be used for the purpose of the invention so long as it is capable of cutting a blank sheet of the type under consideration.

The mold sheet laying section 32 is adapted to lay a mold sheet with a cavity produced by the laser cutting machine in position in the frame manually or automatically. The frame has to be provided with a guide section for guiding the outer periphery of each sheet to a right position and a base section for supporting mold sheets thereon. Preferably, it is additionally provided with a bolt tightening mechanism for tightly screwing the bolts in order to secure a multilayer structure in position that comprises mold sheets and the powdery material filled in the cavities of the mold sheets.

The powdery material feeding section 33 is so designed that it automatically feeds a predetermined powdery material into the cavity of each mold sheet placed in the frame with proper timing. If more than one powdery materials are used and fed to predetermined respective positions in the cavities of the mold sheets to form a layered product, the powdery material feeding sections has to be provided with a control mechanism adapted to control the feeding operation.

The pressurizing section 34 presses the mold sheets whose cavities are filled with one or more than one powdery materials. It typically comprises a press 39 having a press head large enough to cover the surface area of each mold sheet.

The sintering section 35 typically comprises a sintering furnace. For the purpose of the invention, the sintering furnace 12 is preferably adapted to produce a non-oxidizing atmosphere in the inside. A non-oxidizing atmosphere can be produced by introducing argon (Ar), $N_2$, $CO_2$ or $H_2$ into the furnace. The sintering temperature varies depending on the kind of the powdery material used but, in any case, is lower than the melting point thereof. If more than one powdery materials are used, the sintering temperature will be selected by principally taking the highest one of the melting points of the materials into consideration.

The aftertreatment section 36 is designed to remove the "debris" adhering to the sintered product. While the mold sheets are heated and carbonized during the sintering process, they may leave as debris on the product. The aftertreatment section 36 removes all the debris adhering to the sintered product and cleans and finishes the product.

Thus, a product having a desired profile can be accurately produced at low cost in a reduced period of time by means of a method and an apparatus for fabricating a product according to the invention.

In short, the present invention provides the following remarkable advantages.

1) Since laser energy is not involved in the process of thermally treating a powdery material according to the invention, the powdery material is free form specific conditions to be met for laser machining with conventional methods (e.g., oscillation mode, frequency, feeding speed, laser scanning route, etc.) so that a low power laser that is just good for cutting mold sheets may be used to reduce the capital investment and the running cost. Often, the existing laser equipment may be used without modification.

2) Since the laser cutting operation consumes energy only at a reduced rate for the purpose of the invention, it is free from local and thermal deformations including warps and hence a highly precise product can be fabricated.

3) A high precision molding operation is possible by using thin mold sheets. On the other hand, a high speed molding operation is possible by using thick mold sheets.

4) A product comprising different powdery materials can be fabricated to provide a wide variety of applications.

5) A material having a novel composition may easily be invented due to the fact the powdery materials are used for molding.

6) While any powdery materials can be used for the purpose of the invention, debris that can contaminate the environment can be eliminated by selecting appropriate materials other than synthetic resin materials. Recycled paper and materials retrieved from industrial wastes may be used for mold sheets for the purpose of the invention.

7) Since only one or more than one powdery materials are used and no sticky substances are used for the purpose of the invention except a binder or adhesive agent, the product shows a uniform composition. Additionally, since no photosetting resins that are costly and require rigorous control are used, the running cost can be reduced. Still additionally, no contamination occurs due to leftovers and decomposition products.

8) Since no liquidity promoter such as zinc stearate or wax is used to lead the powdery material into a gap for the molding process, a rapid prototyping method according to the invention is free from the problem of environmental contamination due to such substances.

9) Since the non-oxidizing atmosphere is necessary only for the sintering furnace and not for the laser machining operation, the entire fabricating process can be conducted economically.

10) Since the entire structure is placed in the furnace and sintered at a time, it shows a uniform density distribution that is far better than any known multilayer structures that are heated and sintered by means of laser on a layer-by-layer basis. Particularly, it should be noted that a material with a low melting point has to be used for immersion with any known techniques in order to raise the density of the product.

11) Since the multilayer structure of powdery material is surrounded by mold sheets, it is less subjected to thermal deformation.

12) The present invention provides a short manufacturing time that is by far shorter than any known PR molding techniques.

13) Since a product according to the invention can comprise one or more than one movable components as integral parts thereof, the present invention provides a remarkably improved productivity at low cost from the viewpoint of assembling. Additionally, it can produce compact products.

What is claimed is:

1. A rapid prototyping method utilizing a powder sintering process and comprising the steps of slicing an image of a product to be fabricated into a number of layers, preparing a respective mold sheet for each of the layers of the product with a cavity in the mold sheet adapted to the profile of the corresponding layer, laying each mold sheet in place on la previously supplied mold sheet, feeding the cavity of the mold sheet with a powdery material, pressurizing the material, repeating the preceding steps from the step of preparing a mold sheet to the step pressurizing the material for each layer to form a multilayer structure to produce a finished product and removing the residual debris including debris of the mold sheets remaining after the sintering.

2. A rapid prototyping method utilizing a powder sintering process and comprising the steps of slicing an image of a product to be fabricated into a number of layers, arranging a blank support sheet, preparing a respective mold sheet for each of the layers of the product with a cavity in the mold sheet adapted to the profile of the corresponding layer, laying the first of the mold sheets in place on the blank support sheet feeding the cavity of the mold sheet with a powdery material, pressurizing the material, repeating the preceding steps from the step of preparing a mold sheet through applying each mold sheet to the previously supplied mold sheet to the step of pressurizing the material for each layer to form a multilayer structure for a complete product, sintering the multilayer structure to produce a finished product and removing the residual debris including debris of the mold sheets remaining after sintering.

3. A rapid prototyping method utilizing a powder sintering process and comprising the steps of slicing an image of a product to be fabricated into a number of layers, arranging a respective blank mold sheet in place for each layer forming in the blank mold sheet a cavity adapted to the profile of the corresponding layer, applying the mold sheet to a previously supplied mold sheet feeding the cavity of the mold sheet with a powdery material, pressurizing the material, repeating the steps from the step of arranging a blank mold sheet to the step of pressurizing the material for each layer to form a multilayer structure for a complete product, sintering the multilayer structure to produce a finished product and removing the residual debris including debris of the mold sheets remaining after sintering.

4. A rapid prototyping method according to claim 1, wherein the sheets are laid sequentially on the bottom of a jig as they are held by the jig at the outer periphery thereof.

5. A rapid prototyping method according to claim 1, wherein a pair of blank mold sheets are arranged respectively on the top and under the bottom of the mold sheets laid on one another.

6. A rapid prototyping method according to claim 1, wherein, after the step of pressurizing each of the mold sheets, bonding each mold sheet to the previously supplied mold sheet.

7. A rapid prototyping method according to claim 1, wherein the mold sheets having respective cavities adapted respectively to the corresponding profiles of the layers are laid one on the other before repeating the steps of feeding the lowermost empty mold sheet with the powdery material and pressurizing powdery material in the lowermost mold sheet and sintering the multilayer structure.

8. A rapid prototyping method according to claim 7, wherein all or part of the mold sheets are laid and bonded one on the other before repeating the steps of feeding a powdery material, pressurizing the material and sintering the material.

9. A rapid prototyping method according to claim 1, wherein the powdery material for feeding the cavity is a composite comprising a plurality of different component materials.

10. A rapid prototyping method according to claim 9, wherein the component materials of such a composite is used respectively for different specific parts of the finished product.

11. A rapid prototyping method according to claim 10, wherein the different specific parts include some or all of the interfaces of the layers and/or all or part of the top, the bottom end and/or the lateral sides of the multilayer structure.

12. A rapid prototyping method according to claim 1, wherein the mold sheets are made of a material selected from the group consisting of pulp, wood, particle boards, plywood, cork sheets and paper waste that are solid at room temperature and carbonized by applying heat thereto.

13. A rapid prototyping method according to claim 1, wherein the mold sheets are made of a material that maintains its shape at room temperature and collapses without giving off harmful vapor when heated.

14. An apparatus for fabricating a product, utilizing a powder sintering process, by slicing an image of a product to be fabricated into a number of layers, preparing a mold sheet for each of the layers of the product with a cavity adapted to the profile of the corresponding layer, laying the mold sheet in place on a previous one of the mold sheets, feeding the cavity of the mold sheet with a powdery material, pressurizing the material, repeating the preceding steps from the step of preparing a mold sheet to the step of pressurizing a material for each layer, pressurizing the material in all of the layers after forming the multilayer structure and subsequently sintering the multilayer structure to produce a finished product, said apparatus comprising a CAD section for slicing an image of a product and preparing a control program on the basis of the profiles of the layers, a mold sheet profiling section for producing in each of the sheets a cavity adapted to the profile of the corresponding layer as set by means of the control program, a mold sheet laying section for laying the machined sheet in position on a previous one of the mold sheets, a powdery material feeding section for feeding the cavity of the mold sheet with the powdery material, a pressurizing section for applying pressure to the entire mold sheet fed with the powdery material, a sintering section for sintering the multilayer structure prepared by repeating the steps of laying a processed mold sheet, feeding the cavity thereof with the powdery material and pressurizing the entire sheet and an after treatment section for removing debris including debris of the mold sheets remaining from the sintered product.

15. An apparatus for fabricating a product, utilizing a powder sintering process, by slicing an image of a product to be fabricated into a number of layers, preparing a mold sheet for each of the layers of the product with a cavity adapted to the profile of the corresponding layer, laying each mold sheet in place on a previous one of the mold sheets, feeding the cavity of the mold sheet with a powdery material, pressurizing the material, repeating the preceding steps from the step of preparing a mold sheet to the step of pressurizing a material for each layer, pressurizing the material in all of the layers after forming a multilayer structure to produce a finished product and removing residual debris including debris of the mold sheets remaining after sintering, said apparatus comprising a CAD section for slicing an image of a product into layers and preparing a control program for controlling the cavities on the basis of the profiles of the layers, a mold sheet profiling section for producing in each of the sheets laid in position a cavity adapted to the profile of the corresponding layer to produce a mold sheet with a cavity by means of the control program, a sheet laying section for laying a blank mold sheet in position and bonding the mold sheet to the underlying sheet before the mold sheet is machined by the profiling section, a powdery material feeding section for feeding the cavity of the mold sheet with the powdery material, a pressurizing section for applying pressure to the entire mold sheet fed with the powdery material, a sintering section for sintering the multilayer structure prepared by repeating the steps of laying a mold sheet, feeding the cavity thereof with the powdery material and pressurizing the entire sheet and an aftertreatment section for removing the debris including debris of the mold sheets remaining from the sintered product.

16. An apparatus for fabricating a product according to claim 14, wherein the sintering section comprises a sintering furnace adapted to produce a non-oxidizing atmosphere inside the furnace.

17. An apparatus for fabricating a product according to claim 14, wherein the mold sheet profiling section for profiling each mold sheet is a laser cutting machine.

* * * * *